United States Patent [19]
Müller et al.

[11] 3,753,554
[45] Aug. 21, 1973

[54] APPARATUS FOR MAKING POLYURETHANES

[75] Inventors: Gerhard Müller, Munich; Hermann-Josef Raffenberg, Selm Kr. Ludinghausen, both of Germany

[73] Assignee: BASF Wyandotte Corporation, Wyandotte, Mich.

[22] Filed: Aug. 31, 1971

[21] Appl. No.: 176,508

[30] Foreign Application Priority Data
Oct. 30, 1970   Germany.................. P 20 53 435.4
Jan. 22, 1971   Germany.................. P 21 02 978.7

[52] U.S. Cl. ................................ 259/8, 23/252 R
[51] Int. Cl. ........................... B01f 7/18, B01f 15/02
[58] Field of Search ................... 259/7, 8, 23, 24, 259/43, 44, 5, 6; 23/252

[56] References Cited
UNITED STATES PATENTS
| | | | |
|---|---|---|---|
| 2,660,190 | 11/1953 | Blondel | 259/8 |
| 3,164,374 | 1/1965 | Ralph | 259/8 |
| 3,265,365 | 8/1966 | Ward | 259/8 |
| 3,495,808 | 2/1970 | Klein | 259/8 |

*Primary Examiner*—Robert W. Jenkins
*Attorney*—Robert E. Dunn, Joseph D. Michaels, Robert M. Phipps and Bernhard R. Swich

[57] ABSTRACT

An apparatus and process are provided for making a series of batches of foamable polyurethane reaction mixture wherein flushing of the apparatus between each batch is with one of the components used to prepare the reaction mixture.

6 Claims, 3 Drawing Figures

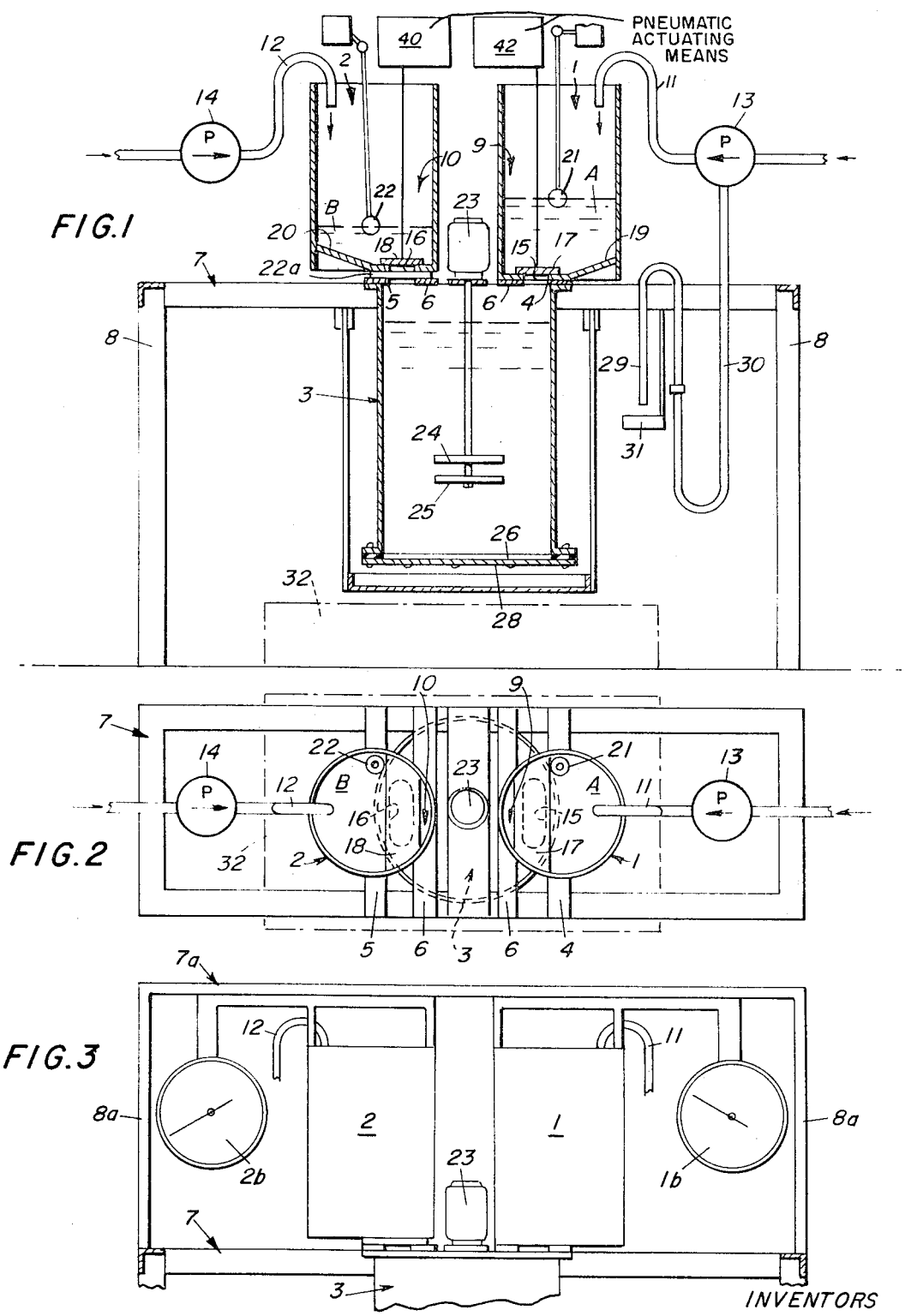

APPARATUS FOR MAKING POLYURETHANES

This invention relates generally to polyurethane foams and more particularly to an apparatus wherein a series of reaction mixtures is prepared in the same mixer and each mixture of the series is charged into a mold.

In the preparation of polyurethane foams, chemical components which react rapidly with expansion into a solid porous material are mixed together in a suitable mixing container and the mixture is discharged therefrom before solidification. The chemical components include a polyol such as a poly(alkylene ether)polyol or hydroxy polyester, an organic polyisocyanate, a blowing agent and various catalysts, stabilizers, fillers and the like. The foamable mixture of components may be poured over a moving surface and permitted to rise freely to form a slab of foam or it may be charged into a closed mold where it reacts and expands to form a solidified foam having the volume and configuration of the mold.

When large volumes of reaction mixture are required to fill a mold, it is often necessary to prepare a separate batch of reaction mixture for each mold or possible for only one or two molds. Even though it has been the practice to mix the components together as rapidly as possible and to discharge the liquid into the mold before any appreciable amount of chemical reaction occurs, there has been a problem with mixers which must be used repeatedly to prepare a series of batches of reaction mixture. A film of reaction mixture always clings to the walls of the container and to the stirring device. The components react with each other quickly to form a urethane. This reaction product, if not removed, will gradually build up on the container walls and other parts of the mixer, contaminate subsequent reaction mixtures and soon render the mixer inoperable. Flushing the mixer with a non-reactive solvent is disadvantageous because it is expensive and such a solvent contaminates the reaction mixtures prepared after flushing of the apparatus or an extended shut-down time is required to remove the solvent.

It is therefore an object of this invention to provide an apparatus for making a series of foamable polyurethane reaction mixtures in the same mixer devoid of the foregoing disadvantages. Another object of the invention is to provide an improved process for molding a series of foamable polyurethane reaction mixtures prepared in the same mixer. Still another object of the invention is to provide an improved process for rinsing a mixing container between batches of foamable polyurethane reaction mixture.

Other objects will become apparent from the following description with reference to the accompanying drawing in which FIG. 1 is a vertical section taken along the line I—I of FIG. 2;

FIG. 2 is a plan view of a preferred embodiment of the invention; and

FIG. 3 is a vertical section of another embodiment of the invention.

The foregoing objects and others are accomplished in accordance with this invention, generally speaking, by providing a process for molding a foamable polyurethane reaction mixture wherein a series of batches of reaction mixture is prepared in the same vessel and the rection vessel is flushed between batches with one of the reactive components of the reaction mixture. An apparatus adapted for use in practicing the process combines a mixing vessel with two measuring vessels above and partially over-lapping the mixing vessel. More specifically, the invention provides a process wherein a series of solid polyurethane foam products is prepared from a plurality of batches of a foamable polyurethane mixture prepared one after the other in a mixing vessel positioned below a plurality of measuring vessels each containing a component of the mixture, each batch is discharged into a mold and, after the discharge of each batch of reaction mixture, the mixing vessel is flushed with one of the components of the next succeeding batch to remove the film of mixture and reaction product clinging to the walls and other parts of the mixing vessel. The volume of flushing component used should be such that all parts of the mixer which are wet with reaction mixture from a previous batch are contacted with flushing component. This may be achieved by using a volume of flushing component which stands above the uppermost level of the previous batch in the mixer or by providing a lesser volume of flushing component and stirring the component vigorously enough to contact all surfaces which are wet with reaction mixture from the previous batch.

Since the volume of flushing component is much greater than the volume of reaction mixture remaining behind after discharge of a batch from the mixing vessel, the chemical composition of the component is charged so insignificantly it can be used in preparing a later batch of reaction mixture. In a prefered embodiment of the invention, only two measuring vessels are required. The blowing agent, polyol, catalyst, surfactant and the like are mixed together and charged into the mixer from one measuring vessel and the organic polyisocyanate is charged from the other measuring vessel. The component containing the polyol is a better solvent for the film remaining on the walls of the mixing vessel so it is preferred as the flushing component.

A particularly preferred apparatus for carrying out the method according to the invention is characterized by measuring vessels for each of the components, which vessels are disposed in fixed position side by side while beneath them a mixing vessel is disposed in a fixed position in such a manner that the horizontal cross-sections of the measuring vessels and the mixing vessel, viewed in the vertical direction, overlap one another as far as possible, and also by a suction tube which is provided for removing excess flushing component and which is adapted to be introduced from above to a desired depth into the mixing vessel. The above described particularly favorable arrangement of the proportioning vessels and mixing vessel in relation to one another thus permits rapid discharge of the components from the measuring vessels into the mixing vessel and also rapid discharge of the mixture into the mold, which is advantageously disposed below the mixing vessel.

The preferably cylindrical proportioning vessels are each provided on their open upper side with an inlet tube containing a pump, the amount of liquid pumped therein being adjustable by means of a float valve or by weighing. An outlet is provided in that part of each bottom measuring vessel which overlaps the mixing vessel. A valve is provided for each outlet. Preferably the valve is pneumatically actuated. That portion of the bottom of the measuring vessel which does not overlap the mixer is sloped towards the outlet.

The preferably cylindrical mixing vessel is advantageously open at the top, at least that part which is overlapped by the measuring vessels. It is preferred that the entire bottom of the mixer be adapted to be opened rapidly, preferably pneumatically. In order to effect good mixing of the components it is preferred to have two agitators rotating in opposite directions and disposed concentrically in the interior of the mixing vessel.

In order to prevent dripping of component mixture into the mold after the batch has been poured, a collecting device, which is preferably adjustable pneumatically, is advantageously disposed below the mixing vessel.

In those embodiments wherein the mixing vessel is charged with a volume of flushing component which is greater than that required in the next batch of reaction mixture, only the excess need be returned to the measuring vessel before the other components are introduced into the mixing vessel.

For the purpose of returning to the measuring vessel the amount of flushing component sucked off from the mixing vessel, the suction pipe may be connected by a flexible pipe to the pump disposed in the supply pipe for the component.

In order to prevent the after-dripping of the component in vessel 2 into the mixing vessel, an adjustable collection device is advantageously associated with the outlet of vessel 2. In addition, a drip collector may also be associated with the suction tube when the latter is disposed outside the mixing vessel.

For the purpose of suspending the entire device according to the invention it is advantageous to provide a horizontal frame on which the proportioning reservoirs situated above the frame and also the mixing vessel situated below the frame are fastened.

The apparatus according to the invention is constructed very simply, with a saving of material, and in a convenient manner. It permits optimum performance of the process according to the invention. In particular the through-flow cross-section of the individual vessels are so designed that a programmed throughput of the individual liquid flows, free from disturbances, is always ensured. The apparatus according to the invention is thus very economical and reliable in operation.

Referring now to FIGS. 1 and 2 of the drawing, a measuring vessel 1 contains a component A of the reaction mixture and measuring vessel 2 contains a component B. Mixing vessel 3 is disposed below and is overlapped by each of vessels 1 and 2. Each of the vessels 1, 2 and 3 is rigidly secured by brackets 4, 5 and 6 to horizontal rectangular shaped frame member 7 supported by vertical members 8. Measuring vessels 1 and 2 are disposed above vessel 3 with a portion 9 and 10 overlapping vessel 3.

Component A may be charged to vessel 1 by pump 13 through pipe 11 from a suitable storage vessel. Component B may be charged to vessel 2 by pump 14 through pipe 12 from a suitable storage vessel. Outlet apertures or drains 15 and 16 in the overlapping portions 9 and 10 of vessels 1 and 2, respectively, are relatively large and are provided with covers 17 and 18 which are adapted to seal the outlets against drippage when closed. Covers 17, 18 can be actuated by pneumatic means 40, 42. Openings 15 and 16 permit rapid discharge of components A and B into the mixing vessel 3. Those portions 19 and 20 of vessels 1 and 2 are sloped towards the openings 15 and 16 to assist flow of liquid from the measuring vessels into mixer 3. Float valves 21 and 22 are provided to actuate pumps 13 and 14 and to regulate the volume of liquid in measuring vessels 1 and 2. A drip plate 22a is disposed below outlet 16 and may be adapted to slide out of the way when liquid is being discharged from vessel 1 to vessel 3.

Two stirrers 24 and 25 are disposed vertically in vessel 3. The stirrers 24 and 25 are disposed concentrically and are rotated by electric motor 23 in opposite directions. The bottom 26 of vessel 3 is removably secured to the sidewalls of the vessel with a suitable gasket therebetween. Drip plate 28 extends below bottom 26 and is adapted to be moved pneumatically into position immediately after bottom 26 is placed in the closed position.

Suction tube 29 may be inserted to the desired depth in mixer 3 and excess flushing component pumped from the mixer 3 back to the proper measuring vessel 1 or 2. Flexible pipe 30 connects tube 29 to pump 3. Drip plate 31 is provided below the lower open end of tube 29.

As illustrated in the drawing, the measuring vessels 1, 2 and mixing vessel 3 are preferably open at the top. Consequently, the interiors of the vessels are readily accessible for repairs and visual inspection.

The apparatus illustrated in FIG. 3 is similar to that of FIGS. 1 and 2 except that measuring vessels 1 and 2 are suspended on scales for weighing the amount of components therein. Vessel 1 is suspended on spring balance 1a while vessel 2 is suspended on spring balance 2a. Spring balances 1a and 2a are rigidly secured to horizontal frame 7a supported by uprights 8a and 8. Scales 1b and 2b indicate the weights of measuring vessels 1 and 2 and their contents. A contact point which may be moved up or down on the scale to set the weight of component to be pumped into vessel 1 or 2 stops pumps 13 and 14 when the desired weight is obtained. This is achieved by the pointer of the indicating device coming into electrical contact with the point on the scale and thereby closing the electrical switch. In this way, the amount of each component pumped to the measuring vessels can be accurately determined irrespective of the specific gravity.

In making a polyurehane foamed plastic, any of the known components may be mixed together. For example, the various formulations disclosed by Saunders and Frisch in Polyurethanes: Chemistry and Technology, published by Interscience Publishers, Library of Congress Card No. 62-18932, 1962, may be used. The polyol which may be a poly(alkylene ether)polyol or a hydroxyl polyester may be mixed with a flurohydrocarbon blowing agent such as trichlorofluoromethane or methylene chloride, a catalyst such as triethylenediamine or dibutyl tin dilaurate or a mixture threof to prepare an A component. An organic diisocyanate such as 4,4'-diphenylmethane or a mixture thereof with its polymers may be component B.

In operating the apparatus, component A is measured volumetrically or by weight in vessel 1 while component B is similarly measured in vessel 2. Component A and B are discharged into vessel 3 simultaneously, quickly mixed together and discharged into a mold. Mixer 3 is promptly charged with a volume of component A greater than the volume of reaction mixture just discharged from mixer 3. Component A is stirred in mixer 3 and that amount in mixer 3 in excess over the amount required for a second batch is transferred back to vessel 1 through suction tube 29. The required amount of component B is charged from vessel 2 to vessel 3 through outlet 16. Drip pan 22a is positioned below vessel 2 immediately after closing of opening 16 to avoid dripping into mixer 3. After thorough mixing of the components with stirrers 24 and 25 the resulting mixture is rapidly discharged through opening 26 into a mold 32 prior to any appreciable reaction of the components. After the reaction mixture is discharged, opening 26 is closed and drip plate 28 is moved into place to avoid dripping into mold 32. The foamable reaction mixture expands and fills mold 32 to form a product such as a mattress.

Although the invention has been described in detail in the foregoing for the purpose of illustration, it is to be understood that such detail is solely for that purpose and that variations may be made by those skilled in the art without departing from the spirit and scope of the invention except as it may be limited by the claims.

The embodiments of the invention in which an exclusive property or privilege is claimed are defined as follows:

1. An apparatus for making a polyurethane foam which comprises two containers for chemically reactive components which when mixed together form a foamable polyurethane reaction mixture and a mixer adapted to mix the components together and discharge the resulting mixture therefrom, the said containers being disposed side by side and above the mixer with the maximum possible cross-section of each container overlapping the mixer, means for charging each container with a measured volume of liquid component comprising a pump and a float valve, means for transferring measured volume of component from each container to the mixer, and means for transferring liquid from the mixer to at least one container.

2. The apparatus of claim 1 wherein the said containers are suspended on a means for continuously weighing them and their contents.

3. The apparatus of claim 2 wherein the weighing means is a spring balance.

4. An apparatus for making a polyurethane foam which comprises at least two containers for chemically reactive components which when mixed together form a foamable polyurethane reaction mixture and a mixer adapted to mixing components together and discharge the resulting mixture therefrom, each container having bottom sloping towards a discharge opening in that portion thereof overlapping the underlying mixer, means for opening and closing the opening, means for transferring measured amounts of component from each container to the mixer, and means for transferring liquid from the mixer to at least one container.

5. The apparatus of claim 4 comprising pneumatic means for opening and closing the discharge opening.

6. An apparatus for making a polyurethane foam which comprises at least two containers for chemically reactive components which when mixed together form a foamable polyurethane reaction mixture and a mixer adapted to mixing components together and discharge the resulting mixture therefrom, the said containers being disposed side by side and above the mixer with the maximum possible cross-section of each container overlapping the mixer, the containers being mounted on means for continuously weighing them, means for transferring measured amounts of component from each container to the mixer and the means for transferring liquid from the mixer to at least one container is a suction tube.

* * * * *

PO-1050
(5/69)

UNITED STATES PATENT OFFICE
CERTIFICATE OF CORRECTION

Patent No. 3,753,554                           Dated August 21, 1973

Inventor(s) Gerhard Mueller and Hermann-Josef Raffenberg

It is certified that error appears in the above-identified patent
and that said Letters Patent are hereby corrected as shown below:

On the first page of the patent for item [75]
and first line under item [19], the first inventor's
name was misspelled. It should read --Gerhard Mueller--.

Signed and sealed this 19th day of March 1974.

(SEAL)
Attest:

EDWARD M. FLETCHER, JR.             C. MARSHALL DANN
Attesting Officer                    Commissioner of Patents